United States Patent [19]

Rivera

[11] Patent Number: 5,117,968
[45] Date of Patent: Jun. 2, 1992

[54] ASSEMBLY FOR CLEANING THE UNDERSIDE OF AN ESCALATOR HANDRAIL

[75] Inventor: James A. Rivera, Bristol, Conn.

[73] Assignee: Otis Elevator Company, Farmington, Conn.

[21] Appl. No.: 792,836

[22] Filed: Nov. 15, 1991

[51] Int. Cl.$^5$ ............................................. B65G 45/00
[52] U.S. Cl. ................................... 198/496; 198/494; 198/338
[58] Field of Search ............... 198/335, 337, 338, 496, 198/494; 15/256.5, 256.52

[56] References Cited

U.S. PATENT DOCUMENTS

| | | |
|---|---|---|
| 3,595,364 | 7/1971 | Schoenweiss . |
| 3,623,590 | 11/1971 | Johnson . |
| 3,910,400 | 10/1975 | Hishitani . |
| 3,941,241 | 3/1976 | Hishitani . |
| 3,946,853 | 3/1976 | Ishida . |
| 4,836,353 | 6/1989 | Adrian et al. . |
| 4,932,512 | 6/1990 | Rivera . |
| 4,934,512 | 6/1990 | Lin et al. . |

Primary Examiner—D. Glenn Dayoan
Attorney, Agent, or Firm—William W. Jones

[57] ABSTRACT

The underside of an escalator or moving walkway handrail is continuously cleaned by an assembly which includes rotating brushes associated with a vacuum nozzle which removes loosened debris from the handrail. The brushes are preferably driven so as to rotate in opposite directions to sweep debris toward the vacuum nozzle. The vacuum nozzle empties into a container which can be periodically emptied during normal servicing of the escalator or walkway.

12 Claims, 2 Drawing Sheets

ASSEMBLY FOR CLEANING THE UNDERSIDE OF AN ESCALATOR HANDRAIL

DESCRIPTION

1. Technical Field

This invention relates to an assembly for use in cleaning the handrails of an escalator or moving walkway, and more particularly, to an assembly for cleaning the surfaces of the handrails which contact the guide rails mounted on the escalator balustrades.

2. Background Art

The problem of keeping the exposed surface of an escalator or moving walkway handrail clean has been addressed in the prior art. U.S. Pat. Nos. 3,910,400 granted Oct. 7, 1975 to K. Hishitani; 3,941,241 granted Mar. 2, 1976 to K. Hishitani; 3,946,853 granted Mar. 30, 1976 to K. Ishida; and 4,934,512 granted June 19, 1990 to H. Lin, et al., all disclose systems wherein the exposed surface of a balustrade handrail is automatically cleaned during operation of the escalator or moving walkway. While keeping the exposed surface of the handrail clean automatically is a desirable goal, the prior art systems do not address the problem of cleaning the handrail underside, i.e., the side of the handrail which slides over the balustrade-mounted guide rails.

Escalator or moving walkway handrails are moved over and slide along a generally T-shaped guide rail. The guide rail may be made of metal, or a combination of plastic and metal. The handrail will be made from rubber, and will have a cloth lining on its surface facing the guide rail. The handrail will be vulcanized at its splice joint. U.S. Pat. Nos. 4,932,512 to J. Rivera; and 4,836,353 to W. Adrian, et al., disclose such conventional handrail/guide rail combinations. The handrails slide over the guide rails throughout the entirety of the passenger conveying run of the escalator or walkway, and will then disengage from the guide rail during the return run, wherein the handrails will engage some sort of drive mechanism. This arrangement is shown in U.S. Pat. No. 3,623,590 to E. Johnson. At the newel portions of the balustrade the handrail will typically pass over a plurality of roller bearings, as is shown in U.S. Pat. No. 3,595,364 to K. Schoeneweiss.

The handrail guide rails are generally formed from component sections which are mounted on the balustrade and which butt each other at joints. Care is taken to form the guide rail butt joints as accurately and as evenly as possible, however, these joints will inevitably cause wear on the handrail undersurface. Changes in ambient temperature, operational stress, age of the equipment, and the like will result in misalignment of adjacent guide rail sections at the joints. When this occurs, the inner surface of the handrail will be abraded, or shaved, and will give off a powdery residue that is referred to in the industry as "handrail dandruff". This phenomenon is concentrated at the vulcanized handrail splices, and at the C-shaped edges of the handrail. The powdery material is particularly harmful to the newel guide roller bearings, and will markedly reduce their operational life. In addition, the black powder can deposit on the steps and other outer components of the escalator, and is unsightly and undesirable for that additional reason. The only solution for this problem has been to have a serviceman periodically vacuum the interior of the handrail and surrounding environment. This solution does not prevent the newel roller bearings from being damaged.

Disclosure of the Invention

This invention relates to an assembly which continuously cleans the interior of the handrail, and removes the dandruff therefrom so long as the escalator or moving walkway is operating. The assembly of this invention is disposed along the return path of the handrail where the latter is displaced from the guide rail and the underside of the handrail is accessible. This can preferably be immediately before or after the handrail engages its drive means. The assembly will be encased in the escalator truss and thus out of sight but readily accessible for inspection and maintenance. The assembly preferably includes a vacuum nozzle and a pair of abrading brushes positioned before and after the vacuum nozzle, as viewed along the path of travel of the handrail. The brushes rotate in opposite directions so as to sweep material off of the handrail toward the vacuum nozzle. The loosened material is then vacuumed off of the handrail into a storage container positioned adjacent to the assembly. The storage container is emptied during normal servicing of the escalator or moving walkway.

It is therefore an object of this invention to provide an assembly for continuously cleaning the undersurface of an escalator or moving walkway handrail while the escalator or the like is in operation.

It is a further object of this invention to provide an assembly of the character described which prevents harmful accumulations of handrail debris from forming.

It is an additional object of this invention to provide an assembly of the character described wherein the handrail debris is removed from the handrail and stored in a collection container.

It is yet another object of this invention to provide an assembly of the character described which facilitates debris removal during periodic maintenance servicing of the escalator or the like.

These and other objects and advantages of the invention will become more readily apparent from the following detailed description of a preferred embodiment thereof when considered in conjunction with the accompanying drawings, in which:

BEST MODE FOR CARRYING OUT THE INVENTION

Figure 1:
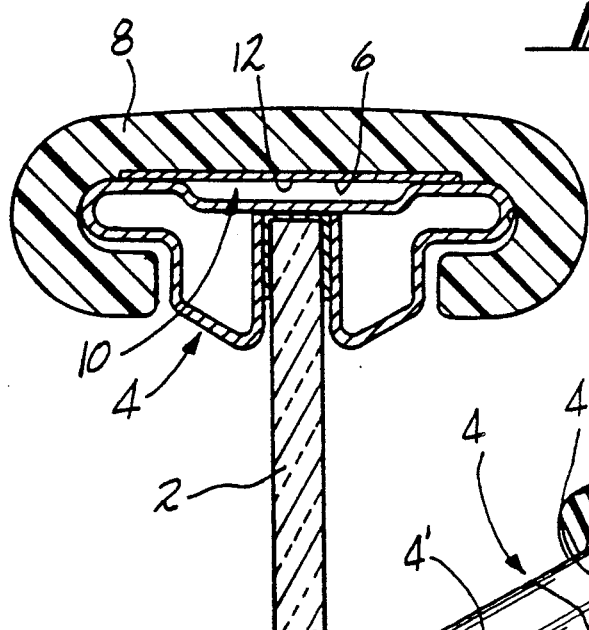
FIG. 1 is a transverse sectional view of the handrail portion of an escalator balustrade.
Figure 2:
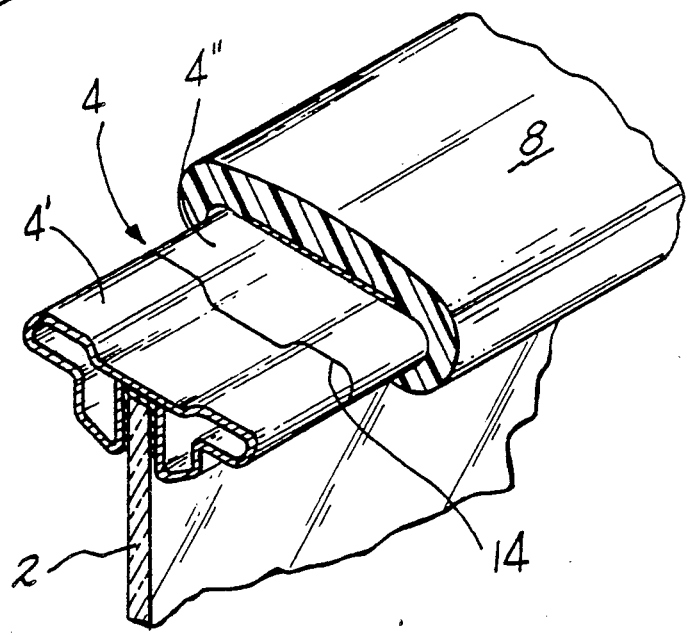
FIG. 2 is a fragmented perspective view similar to FIG. 1, but showing the handrail broken away to expose a butt joint between two adjacent guide rail segments.

Referring now to the drawings, FIGS. 1 and 2 show a typical escalator or moving walkway handrail system with which the cleaning assembly of this invention is useful. The system includes a balustrade 2 which may be formed from glass, and upon which a handrail guide rail 4 is mounted. The guide rail 4 is formed from an appropriately configured sheet of spring steel. The guide rail 4 clamps onto a gasket 6 disposed atop the balustrade 2. The handrail 8 is mounted on the guide rail 6 and curls around the sides of the guide rail 6 so as to effectively conceal the latter from sight. The underside 10 of the handrail 8 is provided with a fabric liner 12 which lessens frictional drag between the handrail 8 and the guide rail 4. As seen in FIG. 2, the guide rail 4 will be made up of sections 4', 4" and the like, which are serially mounted on the balustrade 2, and which abut each other at joints 14. The problem that arises with this type of installation relates to the handrail 8 being dragged over the joints 14 on the guide rail 4. At installation, great care is taken to make the joints 14 as smooth as possible, but with time and wear, the joints 14 will become uneven. Thermal cycling is a major contributor to joint misalignment. As noted previously, guide rail joint misalignment causes abrading and even a shaving of the handrail undersurface 10. This occurs both on the side edges of the handrail which curl over the sides of the guide rail, and also on the fabric layer 12. A buildup of handrail powder thus results which is deleterious to the newel roller bearings, and also soils the external parts of the escalator.

Figure 3:
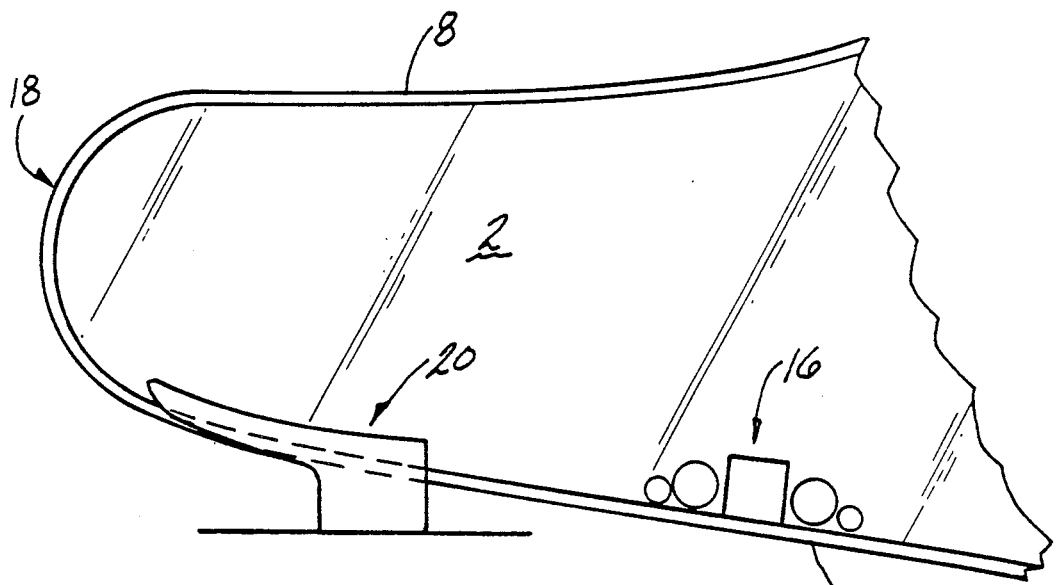
FIG. 3 is a fragmented somewhat schematic side elevational view of an escalator showing the handrail return path and the placement of the handrail cleaning assembly therein.
Figure 4:
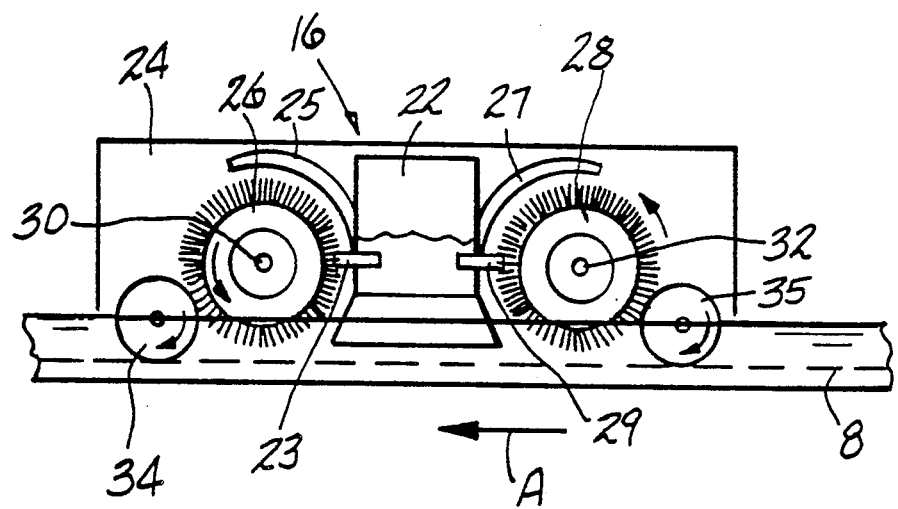
FIG. 4 is a side elevational view of the handrail cleaning assembly.
Figure 5:
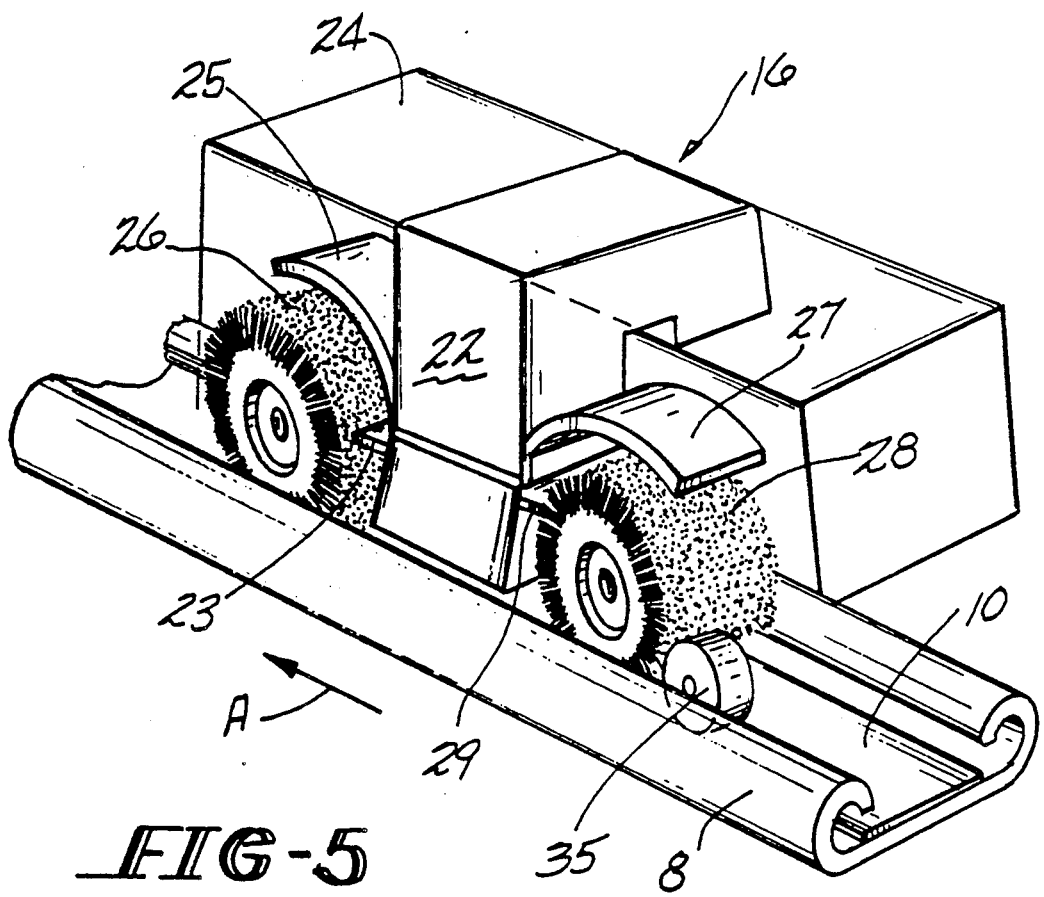
FIG. 5 is a fragmented perspective view of the cleaning assembly.

Referring to FIGS. 3-5 there are shown details of the handrail cleaning assembly denoted generally by the numeral 16. As seen in FIG. 3, the handrail 8 passes around a curvilinear newel 18 on the balustrade 2, and thence through a reentry housing 20. The handrail 8 is enclosed and inaccessible after entering the housing 20. The handrail 8 then takes a generally downwardly directed path to the handrail drive mechanism (not shown). The handrail cleaning assembly 16 may be positioned along the downward run of the handrail 8 as shown in FIG. 3.

FIGS. 4 and 5 show details of the handrail cleaning assembly 16. In FIGS. 4 and 5, it will be presumed that the handrail 8 is moving from right to left in the direction of the arrow A. The handrail assembly 16 includes a vacuum nozzle 22 disposed immediately above the handrail 8. The vacuum nozzle 22 communicates with a storage container 24 disposed adjacent to the handrail 8. A pair of wire brushes 26 and 28 are mounted above the handrail 8 for rotational movement about axes 30 and 32, respectively, which are perpendicular to the direction of movement of the handrail 8. The brushes 26 and 28 continuously wipe the inner surface 10 of the handrail 8 so as to loosen any particulate material disposed thereon. The brush 26 is engaged by a roller 34 which rides on the handrail 8 so as to rotate the brush 26 in a counterclockwise direction about its axis 30. The brush 28 is likewise rotated in a counterclockwise direction about its axis 32 by means of a roller 35 which engages the handrail 8. In this manner, both brushes 26 and 28 sweep material toward the vacuum nozzle 22. The vacuum nozzle 22 has a pair of curvilinear shrouds 25 and 27 which overlie the brushes 26 and 28 respectively, whereby the brushes pass under the shrouds as they rotate toward the nozzle 22. Brush beaters 23 and 29 engage the brushes 26 and 28 respectively to loosen and disengage sweepings from the brushes thereby enhancing the ability of the vacuum nozzle 22 to remove material from the brushes 26 and 28.

It will be readily appreciated that the assembly of this invention will continuously sweep and clean the undersurface of the moving handrail to remove therefrom detritus deposited thereon by the operation of the escalator or walkway. The assembly includes a container for storing material removed from the handrail, which container can be periodically emptied during normal servicing of the escalator. The result is a cleaner escalator having an improved and extended operational life for its newel roller bearings.

Since many changes and variations of the disclosed embodiment of the invention may be made without departing from the inventive concept, it is not intended to limit the invention otherwise than as required by the appended claims.

What is claimed is:

1. In an escalator or moving walkway having a moving handrail which slides over a guide rail mounted on a balustrade, and which handrail moves along a concealed return path, a handrail cleaning assembly for cleaning a guide rail-contacting surface of the handrail, said cleaning assembly comprising:
   a) at least one brush contacting said surface of said handrail for loosening debris therefrom; and
   b) a vacuum system including a vacuum nozzle overlying said surface of said handrail adjacent to said brush, said brush and said vacuum being mounted along said return path of said handrail.

2. The handrail cleaning assembly of claim 1 comprising a second brush mounted on said return path on a side of said vacuum nozzle opposite said one brush.

3. The handrail cleaning assembly of claim 1 further comprising means for rotating said brush about an axis of symmetry which is perpendicular to the direction of movement of said handrail, whereby said brush sweeps said surface in a direction counter to the direction of movement of said handrail.

4. The handrail cleaning assembly of claim 3 further comprising means associated with said vacuum nozzle for loosening debris from said brush to enhance vacuum removal of debris from said brush.

5. The handrail cleaning assembly of claim 3 further comprising roller means contacting said handrail and said brush for imparting rotary movement to said brush in response to rectilinear movement of said handrail.

6. In an escalator or moving walkway having a moving handrail which slides over a guide rail mounted on a balustrade, and which handrail moves along a concealed return path, a handrail cleaning assembly for cleaning a guide rail-contacting surface of the handrail, said cleaning assembly comprising:
   a) at least one generally cylindrical brush mounted adjacent to the handrail along said return path, said brush being mounted for rotation about its axis of symmetry, and being operable to sweep said surface of the handrail to loosen debris therefrom;
   b) a vacuum system including a vacuum nozzle overlying said handrail surface adjacent to said brush and operable to vacuum debris from said brush; and
   c) roller means contacting said handrail and said brush and operable to rotate said brush responsive to rectilinear movement of said handrail.

7. The handrail cleaning assembly of claim 6 wherein said vacuum system further comprising a debris storage container connected to said nozzle.

8. The handrail cleaning assembly of claim 6 further comprising a second rotatable cylindrical brush mounted adjacent to the handrail on a side of said vacuum nozzle opposite said one cylindrical brush and an associated roller contacting said handrail and said second brush to impart rotational movement to said second brush to provide an enhanced removal of debris from said handrail surface.

9. The handrail cleaning assembly of claim 8 wherein said vacuum nozzle includes means associated therewith for scraping said brushes to loosen debris entrained on said brushes.

10. The handrail cleaning assembly of claim 6 wherein said vacuum nozzle includes means associated therewith for scraping said brush to loosen debris entrained on said brush.

11. The handrail cleaning assembly of claim 6 further comprising a shroud overlying said brush to funnel debris entrained on said brush toward said vacuum nozzle.

12. The handrail cleaning assembly of claim 11 further comprising a debris storage container connected to said nozzle and flanking said shroud on one side of the handrail.

* * * * *